Feb. 28, 1956     P. M. G. TOULON     2,736,235
OPTICAL LENS SYSTEMS
Filed Jan. 23, 1952     2 Sheets-Sheet 1
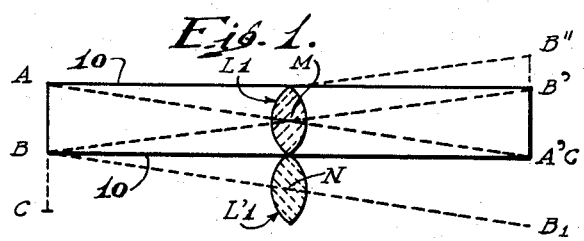
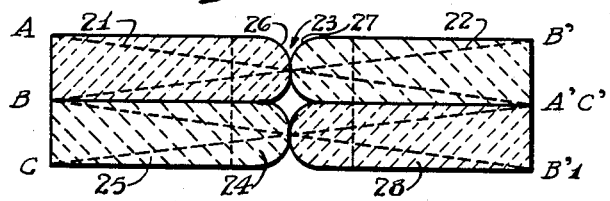
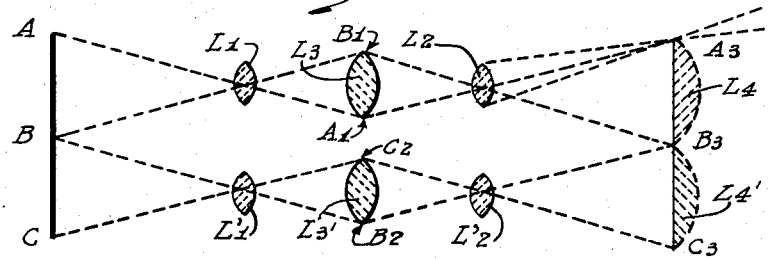
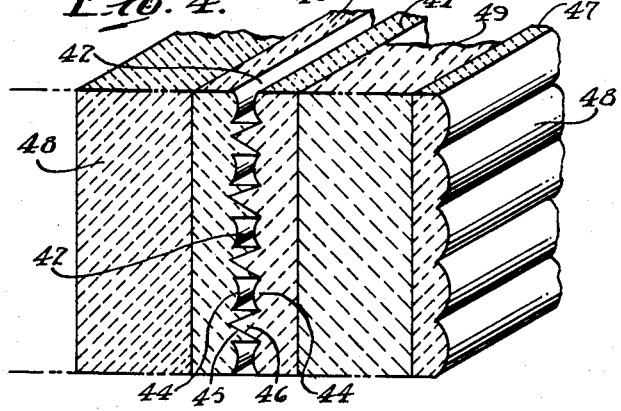
INVENTOR.
P. M. G. Toulon
BY Moore & Hall
ATTORNEYS

# United States Patent Office 2,736,235
Patented Feb. 28, 1956

2,736,235
OPTICAL LENS SYSTEMS

Pierre Marie Gabriel Toulon, New York, N. Y., assignor, by direct and mesne assignments, of seventy-five per cent to Products and Licensing Corporation, Greenwich, Conn., a corporation of Delaware, and twenty-five per cent to Nelson Moore and William D. Hall, as joint tenants Application January 23, 1952, Serial No. 267,821

10 Claims. (Cl. 88—57)

The present invention relates to optical systems for the projection of color moving pictures, for three dimensional projection devices, and for color television systems, and is especially concerned with the provision of a strong, accurate optical configuration in such systems.

It is well known at the present time that an image of an object being observed may be obtained through a succession of converging lenses. In installations such as telescopes five such lenses are ordinarily employed; the first lens produces a first image, which first image is inverted by a second lens to effect a second image. The second image is in turn observed through a third enlarging lens. Fourth and fifth converging lenses are also normally placed in the path of the first and second images to concentrate the light.

In an installation such as that described above, it is essential that the axes of the five lenses be in perfect coincidence. There is no real difficulty in this respect in telescopic applications inasmuch as the lenses can be supported within a relatively strong and rigid tubular structure. Such a structure has little resiliency and there is little danger of the tube flexing to cause misalignment of the various lenses. However, if an optical system comprising a plurality of lenses is desired for large surfaces, such as television or three dimensional viewing applications, the very nature of the system prohibits the use of thick supports between lenses. It is a further requirement of such systems that the lenses be placed at relatively short distances from one another, thus again raising a serious problem of support considerations.

If the supports are too thin, flexing of the system and distortion of the picture results. If supports are thick enough to give the required rigidity to the system, there will be light interference, shadows, and the like visible in the picture being viewed.

Instead of utilizing the plurality of converging lenses supported in air, as described above, the present invention contemplates the provision of an optical system utilizing an "immersion lens" principle. This system comprises a plurality of diverging lenses of air defined within the body of a material having a refraction index higher than air. This body material may be glass, plastic, or combined structures thereof. In such a configuration the portions of the optical system between the air lenses are very strong and rigid and the relative positioning of the various lenses will remain constant even if the distance between lenses is small. Moreover, the body of the optical system itself provides the support for the lenses of the system thus eliminating any need for opaque supports which would tend to block some of the light passing through the system. Preferably, the surfaces of the diverging air lenses are treated or coated to overcome any parasitic reflection of the light passing from material of one refraction index (the plastic or glass body structure) to another material (air). Further, the structure is formed of a plurality of separate sheets and is so constructed that said plurality of plastic or glass sheets may be rigidly and readily assembled to effect the desired air immersion lenses.

One particularly interesting application of the optical system contemplated herein is in color television installations. At the present time, it is known that the apparent color on the face of a cathode ray tube may be varied through the use of a vibrating or reciprocating "color changing" screen. Such a screen ordinarily comprises two surfaces moving in close proximity to one another, one of said surfaces defining a large number of "dot" or "line" apertures, and the second surface having a mosaic or rectilinear configuration of three monochromatics. If the number of lines of the picture being reproduced is relatively high, for instance 525 or 819 lines, it is necessary to use a very fine mosaic of color on the screen. Under such conditions, it has ordinarily been necessary to provide filters on the screen of each of the three basic colors for each line of the picture being reproduced, the "color changing" screen thus requiring upward of 1500 separate lines of color. Such a requirement makes it very difficult to maintain perfect coincidence between the individual colored lines and the moving apertures of the color changing screen.

If, however, the optical system of the present invention is utilized in conjunction with "color changing" screens of the general type described, the individual basic color lines of the screen may be made considerably wider, three colored lines of the screen being associated with, for instance, ten lines of the picture rather than with only a single line of the picture. Such a system thereby permits greater ease and accuracy in the manufacture of the "color changing" screen and results in much better color definition of the reproduced picture.

Again, another type of color television reception employs a picture tube having a plurality of different colored lines applied to the inner surface of the face thereof. These lines of color ordinarily comprise different phosphors tending to give different colors of output when bombarded by an electron beam, the sweep of the system being so controlled that phosphors of the different colors are scanned sequentially. This system has two inherent drawbacks. First, inasmuch as the phosphors must be applied in very thin lines to the inner face of the tube, the manufacture of such tubes presents great practical difficulties and attendant expense. Second, because of the heat usually generated on the inner face of the tube by electron bombardment, organic color cannot be used even though such organic colors would give the best and clearest colored pictures.

Inasmuch as the optical system of the present invention produces an exact image of the picture on the tube face in the same relative position as that on the tube face, and further, inasmuch as the image produced is isolated by the body of the optical system from the picture itself, the raster of multi-colored lines usually employed may be placed on the optical system itself, across the external face of the cylindrical lenticular viewing surface (to be described) or preferably immediately behind said external lenticular face.

It is an object of the present invention, therefore, to provide an optical system having great strength and rigidity. It is a further object to provide such a system for installations requiring the viewing of large surfaces without any light interference due to supports for the lenses.

It is another object of the invention to provide an optical system of large surface and high strength utilizing immersion lenses defined in the interior of a transparent body structure. These immersion lenses are of air in the present description, while the body structure is of a material having a refraction index higher than air. According to an improvement of the invention, the body structure may be formed as a plurality of hollow shells filled with a liquid having the same refraction index as that of the shell. Such an embodiment reduces the quantity and price of body material, such as plastic, which must be used.

Another object of the invention lies in the provision of an optical system which may be readily and inexpensively fabricated, and in a novel structure for said system permitting a plurality of separate parts to be rigidly assembled to define the immersion lenses therein.

A still further object of the present invention resides in a new color television installation utilizing my novel optical system, said system employing a color changing screen having considerably fewer color lines than has heretofore been possible.

Another object of the invention lies in the provision of a new optical system having a raster of colored lines thereon, whereby said optical system may be used in conjunction with a standard picture tube to effect color television reception.

When used in television applications, the optical system of the present invention may utilize lenses which are each associated with a plurality of dots of the picture. Thus, each lens of my optical system may cover ten dots of the television picture, thus permitting the aforementioned reduction in the number of colored lines of a color changing screen, and a very fine lenticular surface may be provided on the external face of my optical system to enlarge the field covered by emerging light.

These and other objects will be readily apparent from the following description and accompanying drawings, in which:

Figure 1 shows the elementary light principles of a converging lens.

Figure 2 shows the light principles, analogous to those of Figure 1, of a diverging air lens.

Figure 3 shows the light principles of an air optical system for projecting large images, using converging lenses.

Figure 4 is a horizontal section, in perspective, of a portion of my optical system.

Figure 5:
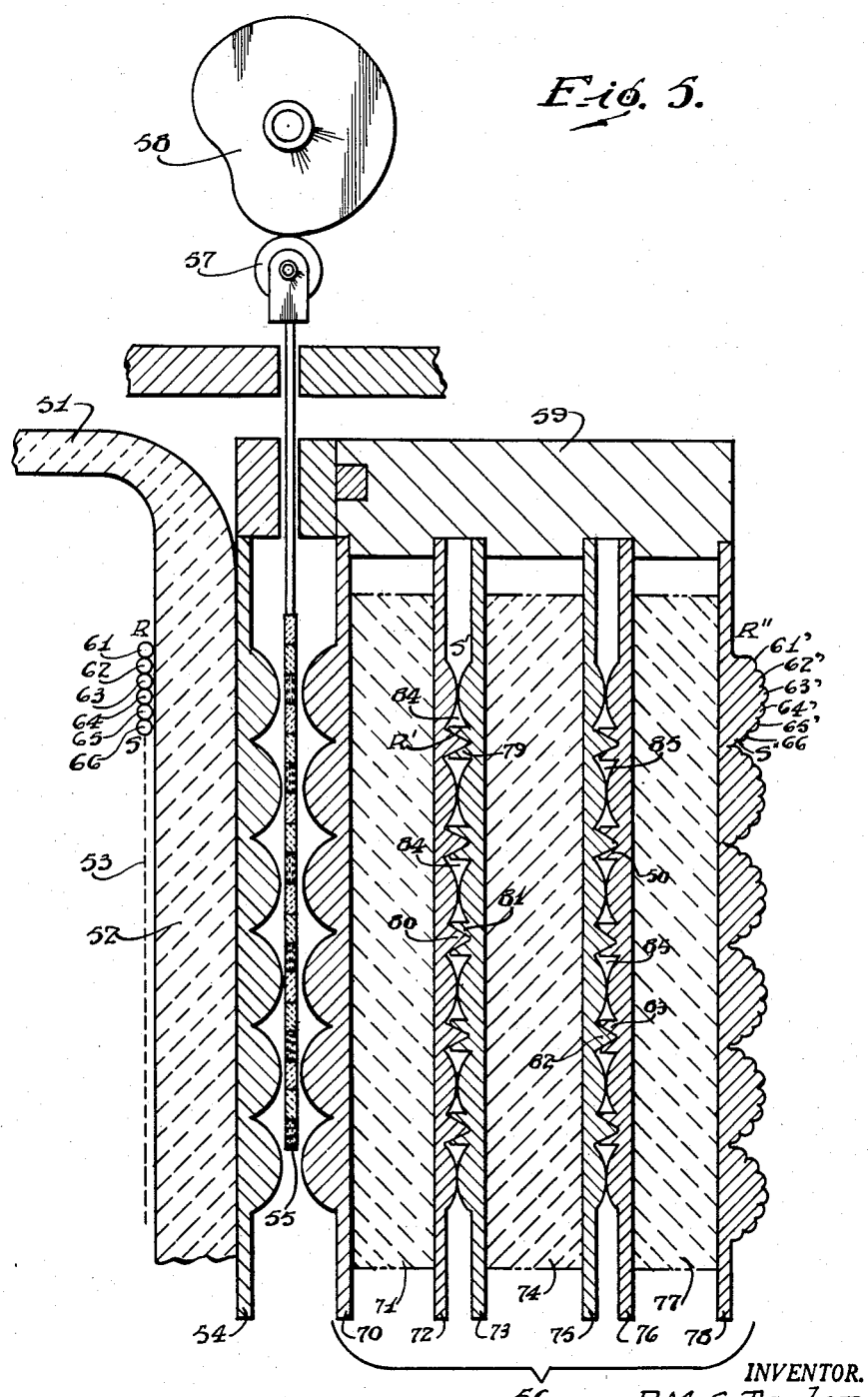
Figure 5 is a horizontal section of a color television system employing a cathode ray tube, a color changing screen, and my optical system.

Referring to Figures 1 and 2, I have illustrated the principles whereby a converging lens having a refraction index greater than air may be replaced by a diverging lens of air "immersed" in a body structure having an index higher than air. Figure 1 illustrates the use of a succession of converging lenses $L_1$, $L_1'$ for projecting an object ABC, etc. Light from an object AB passing through the lens $L_1$, produces an image B'A'. Similarly, another object BC, directly below the first object, will form an image C'B_1'. Each of the lenses is supported in place by a sheet or tubular support 10.

If it is desired that the image B'A' be in a given fixed position with respect to object AB, it is necessary that the center M of lens $L_1$ be maintained accurately with respect to object AB. Similarly, the center N of lens $L_1'$ must be fixed in position with respect to object BC. If the support 10 which is provided is relatively heavy, to effect the necessary rigidity, the viewing field will be considerably reduced. However, if thin or only partial supports are used, the entire system will tend to flex under relatively light stresses so that B', for instance, would be shifted in position to a point such as B''.

The immersion lens system shown in Figure 2 avoids this problem. The system, when compared to that of Figure 1 replaces the converging lenses of Figure 1 (index greater than air) with diverging lenses of air, and also replaces the air spaces in the system of Figure 1 with transparent solid material (index greater than air). Referring more specifically to Figure 2, which is a horizontal section through a simplified lenticular portion of my system, the system comprises, for each image, sheets 21 and 22 of glass or plastic. Each sheet is of a thickness appropriate to the size of object being translated, and one external edge of each of the sheets 21, 22 is formed as a convex molded surface 26, 27. The edges 26, 27 are cylindrical (or spherical) in shape. The edges 26, 27 when placed adjacent one another as shown define a biconcave air lens 23 therebetween. By employing appropriate indices of refraction of the molded materials 21, 22 the image B' A' of an object AB is obtained on the external face of the second sheet 22. Similar considerations apply to further molded sheets 25, 28 which are associated with object BC to effect an image $C'B_1'$. Further sheets may also be provided to form a continuous lenticular sheet, to thereby translate a large surfaced object. The system is compact and the centering of the lenses, in respect to the object and image, is maintained accurately. Moreover, each of the sheets of the system may be constructed of a rectangular solid glass sheet to one edge of which is affixed a molded convex surface of plastic.

The type of lens described above has many applications. For instance, it may be utilized in color projection systems, in three dimensional systems, etc.

The systems of Figures 1 and 2 serve to form a series of individually inverted images. Such a system will not alone reproduce a composite picture made up of a plurality of small "objects" since the individual inversion will upset the relative positioning of these "objects" in the composite image. In order to accurately translate a large surfaced image, a further set of individual lenses must be provided to once more invert each of the first images, so that the composite of second images formed will be an accurate translation of the composite object. One such system, employing classical converging lenses, is shown in Figure 3, the optical equivalent of this system, in accordance with my invention, being shown in the apparatus of Figure 5.

The system of Figure 3 is an extension of the system shown in Figure 1. Light from the object AB passing through lens $L_1$ gives a first reversed image $A_1B_1$. Preferably, this image is smaller than the object AB. In the plane of this first image, a lens $L_3$ is provided to redirect the light rays through a further lens $L_2$ which again reverses the image to form real image $A_3 B_3$. If the lenses $L_1$ and $L_2$ are symmetrical, the image $A_3 B_3$ is of the same size and disposition as the object AB. By analogy, further lens systems, of the type described, operating to translate adjacent objects such as BC will effect further real images such as $B_3C_3$. By multiplying such a system it would be theoretically possible to obtain a continuous surface $A_3B_3C_3$, of the same size and relative positioning as a composite object ABC. This discussion has ignored the question of support for the lenses, however, which is solved by forming the optical system in accordance with my invention.

Once more referring to Figure 3, it is preferable to provide, in the plane of the second images $A_3B_3C_3$, a plurality of plano-concave lenses such as $L_4$, $L_4'$. In the absence of such lenses, it is evident that marginal rays coming from the lens $L_2$, for instance, would not be seen by a spectator. The intermediate image $A_1B_1$ must be smaller than AB or $A_3B_3$ in order to permit mechanical support to be introduced in the lens system at that point. For the same reason, the diameters of lenses $L_1$ and $L_2$ must be small in comparison to the size of AB. The surfaces of all lenses are also preferably coated to reduce the reflecting qualities of the surface and avoid the formation of parasitic images.

Figure 4 illustrates a portion of my optical system, analogous to the lens sections $L_2$ and $L_4$ of Figure 3, showing one method of constructing the lenses. The main portion of the system comprises two glass plates 48 and 49. A first molded plastic sheet 40 is affixed to one face of glass plate 48 by an appropriate transparent adhesive. Similarly, to one face of plate 49, a further molded plastic sheet 41 is affixed. Each of the molded sheets 40 and 41 comprise, in cross section, a plurality of curved portions 44 separated respectively by stampings or projections 45 and 46. The portions 44 extend across the entire body of sheet 40 (or 41) to define a plurality of cylindrical lens surfaces. Projections 45, in the form of a V-shaped indentation between line surfaces of sheet 40, are adapted to receive complementary projections 46 between the lens surfaces of sheet 41. When the sheets 40 and 41 are joined by suitable adhesive at projections 45 and 46, the surfaces 44 define therebetween a plurality of cylindrical diverging air lenses 42. In the normal use of my optical system, in for instance a television installation, the air lenses 42 will extend vertically through the body of the optical system. The surfaces 44, as has been previously discussed, are preferably coated to reduce reflection therefrom.

Affixed to a further surface of plate 49, and parallel to sheet 41, is a further plastic sheet 47 having a molded lenticular surface 48. Each cylindrical lens of the surface 48 is associated with one of the air lenses 42 and serve a purpose similar to that discussed with respect to lens $L_4$ of Figure 3. Once more, in normal use, the cylindrical lenses 48 are preferably vertically disposed. If the optical system described is to be used in a television system, each lens 42 (or 48) will be associated with a plurality of dots, for instance ten, in each horizontal line of the raster. In order that large angle viewing of the screen be permissible, each cylindrical lens 48 may be subdivided into a plurality of elemental cylindrical lenses (as shown in Figure 5), each of these elemental lenses in turn being associated with a single dot in each horizontal line of the raster.

Further, if the optical system is to be employed in a color television system utilizing a plurality of different colored, horizontally disposed lines, these lines may be incorporated in the optical system rather than in the picture tube. In such an installation, the lines would take the form of horizontally disposed filters of the three monochromatics disposed in the form of a raster, preferably between the molded front surface 48 and the glass plate 49, and organic materials may be utilized in effecting the raster of filters.

Figure 5 illustrates a horizontal section of an optical system, constructed in accordance with my invention, as used in a color television system employing a color changing screen. The system comprises a cathode ray tube 51 having a front viewing or picture surface 52 and a phosphorescent screen 53 deposited thereon. The phosphorescent screen, for the purposes of the present discussion, may be considered to comprise a plurality of dot elements 61, 62, 63, 64, etc. in each horizontal line of the raster scanned. Applied to the external surface of face 52 is a cylindrical lens surface 54, each vertical lens of the surface being associated with a plurality of dots, for instance 61–66 inclusive, in each horizontal line. The dots 61–66 may be considered an "object" RS.

In front of lenticular surface 54 is a movable plate and color mosaic or slit screen 55 comprising a plurality of monochromatic filters, and an optical system in accordance with my invention and generally designated as 56 is placed in front of the screen 55. The screen 55 is driven, in the embodiment shown, by a cam 58 and a cooperating roller 57 coupled to the screen. The cam 58 is in turn rotated at a desired speed by an electric motor (not shown) synchronized by the "end of frame" signals of the television transmission.

The lens system 56 is rigidly maintained at the desired distance from the picture tube 51 by a setting 59 of any appropriate material. The lens system comprises a first lenticular sheet 70, preferably of plastic, each of the lenses of surface 70 having a complementary lens in the surface 54, and thereby effecting a first plurality of diverging air lenses (corresponding to the $L_1$ group of Figure 3) in which the color screen 55 may oscillate. A glass plate 71 acts as a primary support for lenticular sheet 70, and a further plastic lenticular surface 72 is cemented to the other side of plate 71. Similarly, glass sheet 74 has molded lenticular surfaces 73 and 75 cemented to opposite sides thereof, and glass sheet 77 has lenticular surfaces 76 and 78 on opposite sides thereof.

Lenticular surfaces 72–73 and 75–76 have wedges or projections 80–81 and 82–83 of the type discussed in reference to Figure 4, between individual lenses thereof, and these projections serve to effect a rigid assembly between the component parts of the system. When assembled as shown, sheets 72–73 define a second plurality of cylindrical diverging air lenses 84 (corresponding to the $L_3$ group of Figure 3), and a first set of reversed images S' R' are effected in the plane of these lenses. Likewise, sheets 75–76 define a third plurality of diverging air lenses 85 therebetween (corresponding to the $L_2$ group of Figure 3), and these serve to once more reverse the image S'R' to effect a real image R''S'' in the plane of lenticular sheet 78. This final image is of the same size as the original object RS, and represents the dot information on fluorescent screen 53.

The complete lenticular system thus translates the full picture appearing on the fluorescent screen, and each dot in the image has the same positional relation to every other dot as originally occurred in the composite object picture on the face of the picture tube. The system is thus of great value in color television systems wherein a plurality of colored lines are ordinarily placed on the tube face itself. The vibrating screen may be eliminated in such a system, and the colored lines may be placed on the forward surface of sheet 78 or, preferably, between sheet 78 and plate 77. It is also readily apparent that the lines may be placed between the tube face 52 and plastic sheet 54.

In the systems described, each diverging air lens has been associated with a plurality of dots on the picture tube face. If the system is used with a color changing screen installation, the individual filters or transparencies of the color screen may be made several times as large in diameter as has heretofore been possible. It is preferable, in color screen installations, to make the intermediate lenses 84 and 85 smaller than the other lenses, namely of the same size as a single color segment of the color screen. The portions separating the respective intermediate lenses are blacked out, this structure thereby insuring the successive passage of light of only a single color. The individual lenses of the forward lenticular surface are preferably subdivided into further elemental lenses, the number of these elemental lenses corresponding to the number of dot elements with which each main lens is associated. By employing this expedient, the dots 61—66 appear as separated dots 61'—66' on the forward lens surface, thus making considerably larger viewing angles permissible.

Having thus described my invention, I claim:

1. An optical system comprising a first plurality of object lenses; a first transparent body member coupled to said first plurality of lenses, a second transparent body member coupled to said first body member, said first and second transparent body members having lenticular surfaces for defining a first plurality of diverging air lenses therebetween in a first plane, a third transparent body member coupled to said second body member and defining a second plurality of diverging air lenses in a second plane parallel to said first plane, each lens of said plurality of object lenses having a complementary lens in each of said first and second plurality of lenses, said first, second and third transparent body members being rigidly coupled together by transparent fastening means interposed between each lens of said first and second pluralities of air lenses.

2. The apparatus of claim 1 in which at least one of said first, second, and third transparent body members includes a raster of colored lines.

3. An optical system comprising a first transparent body member having a lenticular surface on each of two parallel faces thereof, a second transparent body member having a lenticular surface on each of two parallel faces thereof, and first transparent fastening means between the lenses on one face of said first body member, second transparent fastening means complementary to said first fastening means between the lenses on said second body member each for fastening said first and second body members rigidly together in face-to-face relation, the lenticular surfaces on said first body member having complementary lens surfaces on said second body member, the lenticular surfaces on said first and second body members which are in face-to-face relation serving to define a plurality of diverging air lenses therebetween.

4. The system of claim 3 in which said lens surfaces have reflection reducing coatings thereon to reduce reflection of light passing therethrough.

5. The system of claim 3 in which each of said lenticular surfaces are cylindrical lenticular surfaces, said first means for fastening said bodies together comprising a plurality of projections integrally formed with said first body member and disposed between lens elements on one face of said first body member and said second fastening means comprising a plurality of complementary indentations integrally formed with said second body member and disposed between lens elements on one face of said second body member.

6. The system of claim 1 in which said third body member also includes a further lenticular viewing surface disposed along an external face thereof, the lenses in said further lenticular surface being of substantially the same size as those of said plurality of object lenses.

7. The system of claim 6 in which each lens of said system is a cylindrical lens.

8. The system of claim 3 in which each lens of each of said lenticular surfaces is a cylindrical lens, said first fastening means comprising a plurality of first elongated projections respectively projecting from between each lens on said first body member, said second fastening means comprising a further plurality of second elongated projections having depressions adapted to receive respectively said first elongated projections.

9. The system of claim 3 in which said lenticular surfaces and fastening means are formed of molded plastic material, said molded lenticular surfaces and fastening means being adhered to transparent base members to thereby define said first and second body members.

10. The system of claim 9 in which a raster of colored lines is defined between the adhering surfaces of at least one of said lenticular surfaces and its complementary base member.

References Cited in the file of this patent

UNITED STATES PATENTS

| | | |
|---|---|---|
| 2,018,592 | Arnulf | Oct. 22, 1935 |
| 2,093,288 | Ogloblinsky | Sept. 14, 1937 |
| 2,150,225 | Kaszab | Mar. 14, 1939 |
| 2,154,868 | Genies | Apr. 18, 1939 |
| 2,186,123 | Raritsch et al. | Jan. 9, 1940 |
| 2,268,351 | Tanaka | Dec. 30, 1941 |
| 2,338,654 | MacNeille | Jan. 4, 1944 |
| 2,388,203 | Zindel | Oct. 30, 1945 |
| 2,495,697 | Chilowsky | Jan. 31, 1950 |
| 2,522,390 | McCarthy | Sept. 12, 1950 |
| 2,538,071 | Young | Jan. 16, 1951 |
| 2,543,463 | Malm | Feb. 27, 1951 |
| 2,550,350 | Henson | Apr. 24, 1951 |
| 2,605,434 | Homrighous | July 29, 1952 |
| 2,622,220 | Geer | Dec. 16, 1952 |

FOREIGN PATENTS

| | | |
|---|---|---|
| 467,995 | Great Britain | June 28, 1937 |